US009654246B2

(12) United States Patent
Ji et al.

(10) Patent No.: US 9,654,246 B2
(45) Date of Patent: May 16, 2017

(54) LOW COST SECURE SUBMARINE ROADM BRANCHING UNIT USING BIDIRECTIONAL WAVELENGTH-SELECTIVE SWITCH

(71) Applicant: NEC Laboratories America, Inc., Princeton, NJ (US)

(72) Inventors: Philip Nan Ji, Cranbury, NJ (US); Ryuji Aida, Tokyo (JP); Ting Wang, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/938,771

(22) Filed: Nov. 11, 2015

(65) Prior Publication Data
US 2016/0149663 A1 May 26, 2016

Related U.S. Application Data

(60) Provisional application No. 62/082,713, filed on Nov. 21, 2014.

(51) Int. Cl.
*H04J 14/02* (2006.01)
(52) U.S. Cl.
CPC ...... *H04J 14/0212* (2013.01); *H04J 14/0204* (2013.01); *H04J 14/0205* (2013.01); *H04J 14/0216* (2013.01); *H04J 14/0221* (2013.01)
(58) Field of Classification Search
CPC .................................. H04J 14/0201–14/0221
USPC ...................................................... 398/82–88
See application file for complete search history.

(56) References Cited

U.S. PATENT DOCUMENTS

| 6,211,980 | B1 * | 4/2001 | Terahara | H04J 14/0209 |
| | | | | 385/16 |
| 7,899,334 | B2 * | 3/2011 | Zhong | H04J 14/0204 |
| | | | | 398/157 |
| 7,903,975 | B2 * | 3/2011 | Sasaki | H04J 14/0212 |
| | | | | 385/16 |
| 8,111,995 | B2 * | 2/2012 | Wisseman | G02B 6/2931 |
| | | | | 398/48 |
| 8,126,330 | B2 * | 2/2012 | Wisseman | H04J 14/0212 |
| | | | | 398/2 |
| 8,346,089 | B2 * | 1/2013 | Wisseman | H04J 14/0204 |
| | | | | 398/83 |
| 8,457,497 | B2 * | 6/2013 | Zhong | H04J 14/0204 |
| | | | | 385/16 |
| 8,526,814 | B2 * | 9/2013 | Uehara | H04Q 11/0005 |
| | | | | 398/50 |
| 2002/0186434 | A1 * | 12/2002 | Roorda | H04J 14/0204 |
| | | | | 398/82 |
| 2004/0208546 | A1 * | 10/2004 | Alaimo | H04J 14/0204 |
| | | | | 398/49 |

(Continued)

*Primary Examiner* — Li Liu
(74) *Attorney, Agent, or Firm* — Joseph Kolodka

(57) ABSTRACT

A reconfigurable optical add/drop multiplexer (ROADM) unit includes a first optical circulator coupled to a first terminal; a second optical circulator coupled to a second terminal; a third optical circulator coupled to a third terminal; a fourth optical circulator coupled to a fourth terminal; a first wavelength-selective switch (WSS), coupled to the first, second, and third optical circulators; a second WSS coupled to the first, second, and fourth optical circulators, wherein the first and second WSSes are bidirectional operated; a first 1:2 coupler positioned between the first circulator and the first and second WSSes; a second 1:2 coupler positioned between the second circulator and the first and second WSSes.

10 Claims, 9 Drawing Sheets

(56) References Cited

U.S. PATENT DOCUMENTS

| | | | |
|---|---|---|---|
| 2006/0034610 A1* | 2/2006 | Akiyama | H04J 14/0204 398/83 |
| 2007/0269211 A1* | 11/2007 | Doerr | H04J 14/0209 398/49 |
| 2008/0056715 A1* | 3/2008 | Akiyama | H04J 14/0209 398/45 |
| 2008/0181605 A1* | 7/2008 | Palacharla | H04J 14/0204 398/50 |
| 2009/0041457 A1* | 2/2009 | Maki | H04J 14/0204 398/45 |
| 2009/0232497 A1* | 9/2009 | Archambault | H04J 14/0206 398/50 |
| 2011/0052201 A1* | 3/2011 | Ji | H04J 14/0204 398/83 |
| 2011/0262143 A1* | 10/2011 | Ji | H04J 14/0204 398/83 |
| 2011/0286746 A1* | 11/2011 | Ji | H04J 14/0204 398/83 |
| 2013/0259474 A1* | 10/2013 | Ji | H04J 14/0212 398/48 |
| 2013/0259475 A1* | 10/2013 | Ji | H04Q 11/0005 398/48 |

* cited by examiner

LOW COST SECURE SUBMARINE ROADM BRANCHING UNIT USING BIDIRECTIONAL WAVELENGTH-SELECTIVE SWITCH

This application claims priority to Provisional Application Ser. No. 62/082,713 filed 2014 Nov. 21, the content of which is incorporated by reference.

BACKGROUND

The present invention relates to ultra-wide band optical digital coherent detection.

Submarine optical networks form the backbone of global communication networks. Submarine optical networks usually consist of main trunks that connect the trunk terminals, which are point-to-point cable links with in-line optical amplifiers to boost the signal power, and branch path that connect to other branch terminals. A branching unit (BU) is a network element that splits the signal between the main trunk and the branch path and vice versa. This allows the signals from different paths to share the same fiber, instead of installing dedicate fiber pairs for each link. The signal splitting and combining function of the BU is usually performed optically, therefore the BU has the similar function as the optical add/drop multiplexer (OADM) in the terrestrial WDM networks. FIG. 1 shows the schematic of existing submarine communication system that consists of two trunk terminals, one branch terminal and one BU that links the main trunk with the branch path. Bidirectional fiber transmission is illustrated. Note that there are there are two pairs of fiber between the BU and the branch terminal. One pair is used to connect Trunk Terminal 1 to the branching terminal, while the second pair is used between Trunk Terminal 2 and the branch terminal. This allows the reuse of the same wavelengths in the TT1-BT path and the TT2-BT path.

SUMMARY

In one aspect, a reconfigurable optical add/drop multiplexer (ROADM) unit includes a first optical circulator coupled to a first terminal; a second optical circulator coupled to a second terminal; a third optical circulator coupled to a third terminal; a fourth optical circulator coupled to a fourth terminal; a first wavelength-selective switch (WSS), coupled to the first, second, and third optical circulators; a second WSS coupled to the first, second, and fourth optical circulators, wherein the first and second WSSes are bidirectional operated; a first 1:2 coupler positioned between the first circulator and the first and second WSSes; a second 1:2 coupler positioned between the second circulator and the first and second WSSes.

Advantages of the system may include one or more of the following. ROADM subsystem design that achieves all 3 requirements. It uses optical circulators to perform bidirectional operation, and utilizes the non-directional feature of WSS and symmetric wavelength plan of the submarine network. By using each WSS twice (one for each direction), the WSS number is reduced by half. It also maintains the secure data delivery feature for all links. The ROADM subsystem design enables low cost ROADM BU, since it requires only two 1×2 WSS's in the system (the other components, such as coupler/splitter and optical circulators, are compact, passive optical components and have much lower cost compared to WSS), while delivering full reconfigurability and secure data delivery. Therefore it is a low cost, fully functional solution.

BRIEF DESCRIPTION OF THE DRAWINGS

The drawing and figures depict one or more implementations in accord with the present concepts, by way of example only, not by way of limitations.

FIG. 2A shows an exemplary structure of a Branching Unit without add/drop while

DESCRIPTION

Figure 1:
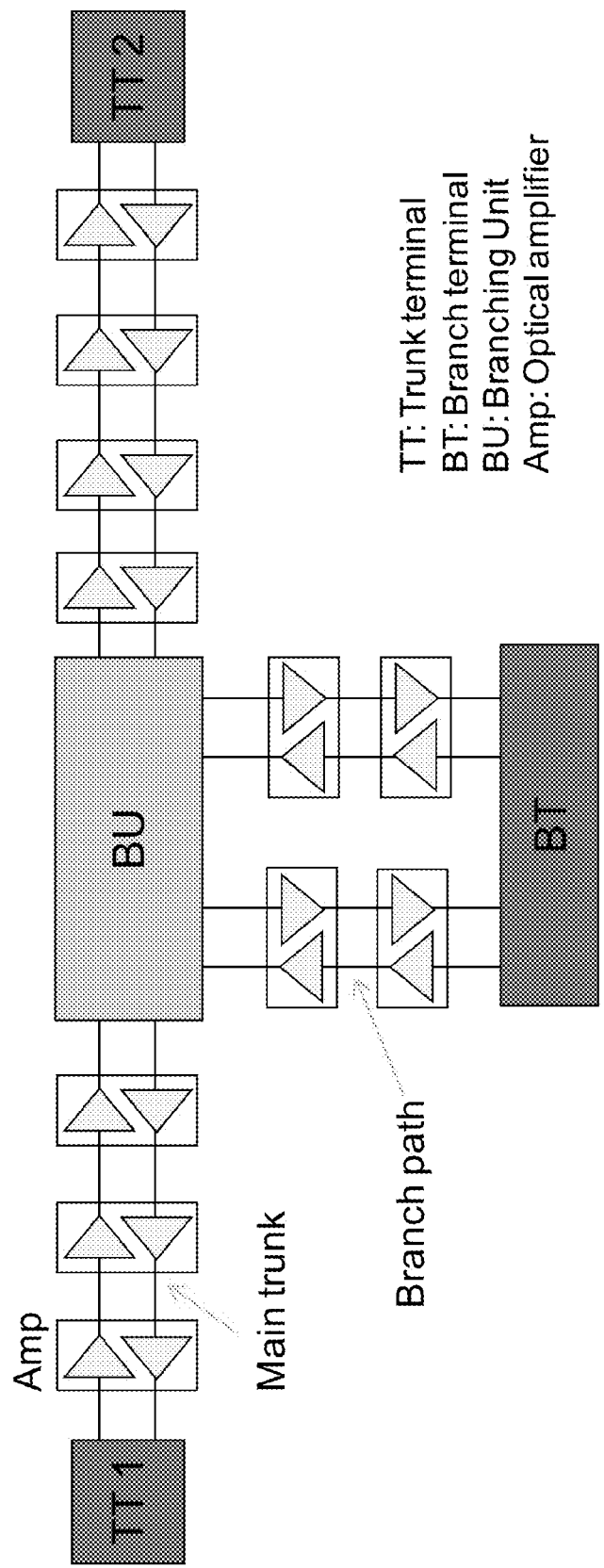
FIG. 1 shows an exemplary existing submarine communication system.
Figure 2A:
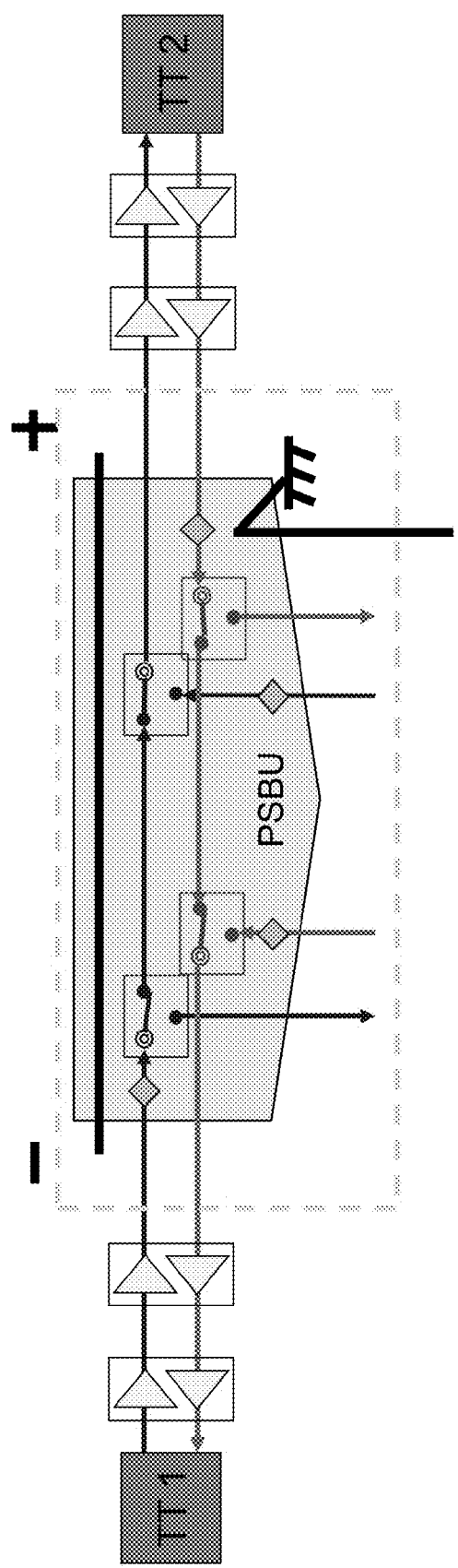
Figure 3:
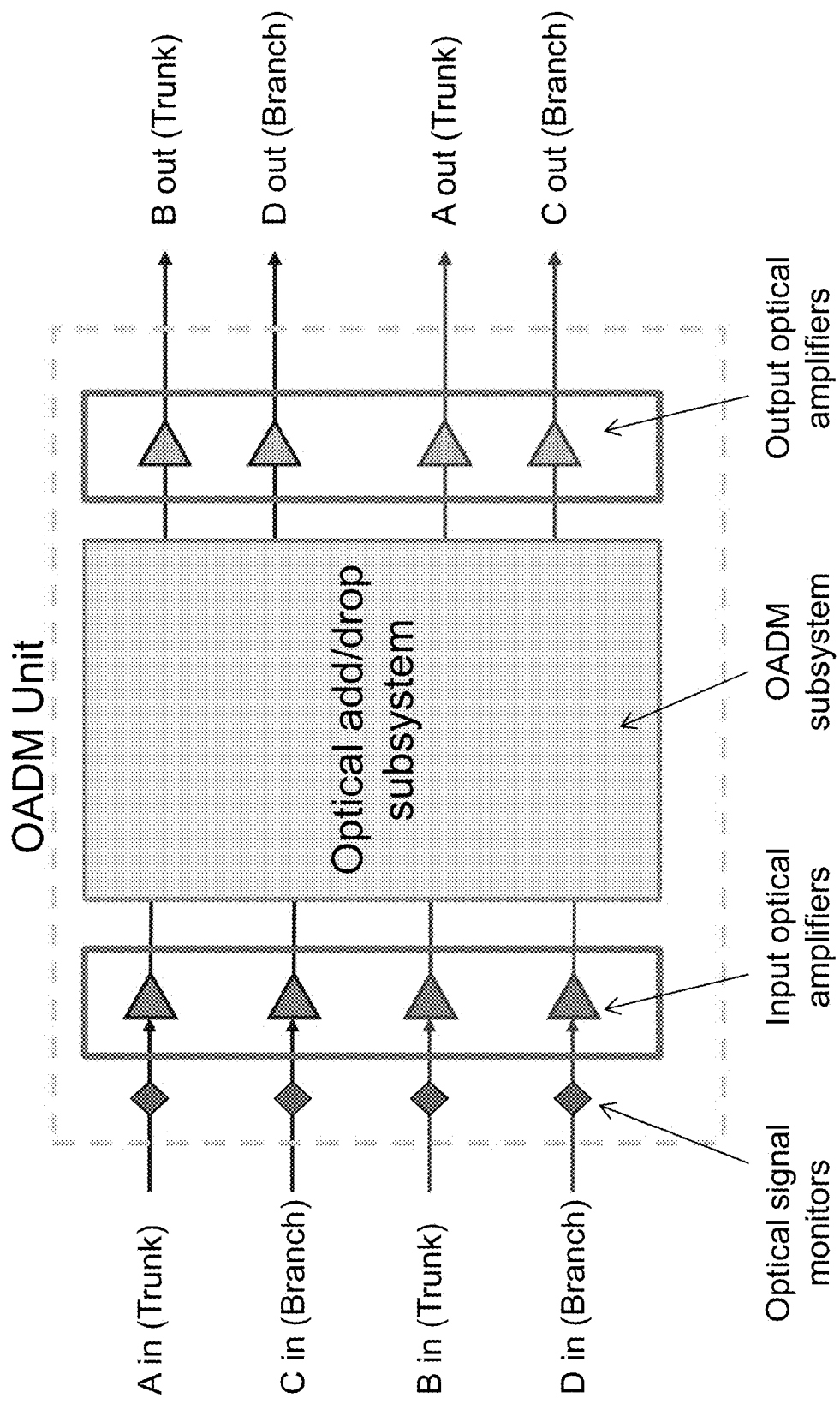
FIG. 3 shows an exemplary ROADM Unit Configuration.
Figure 4:
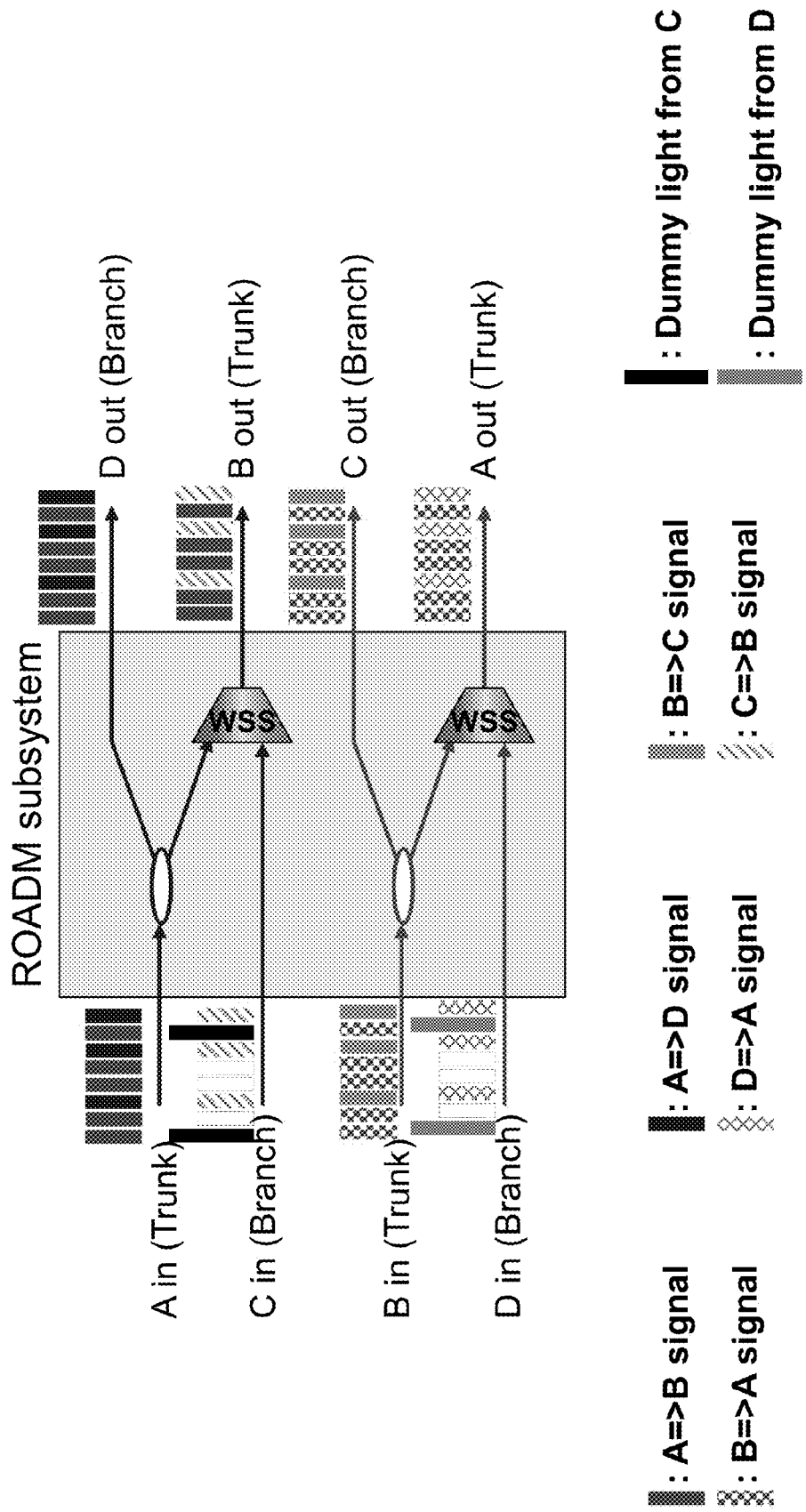
FIG. 4 shows an exemplary Broadcast-and-Select WSS-based ROADM subsystem.
Figure 5:
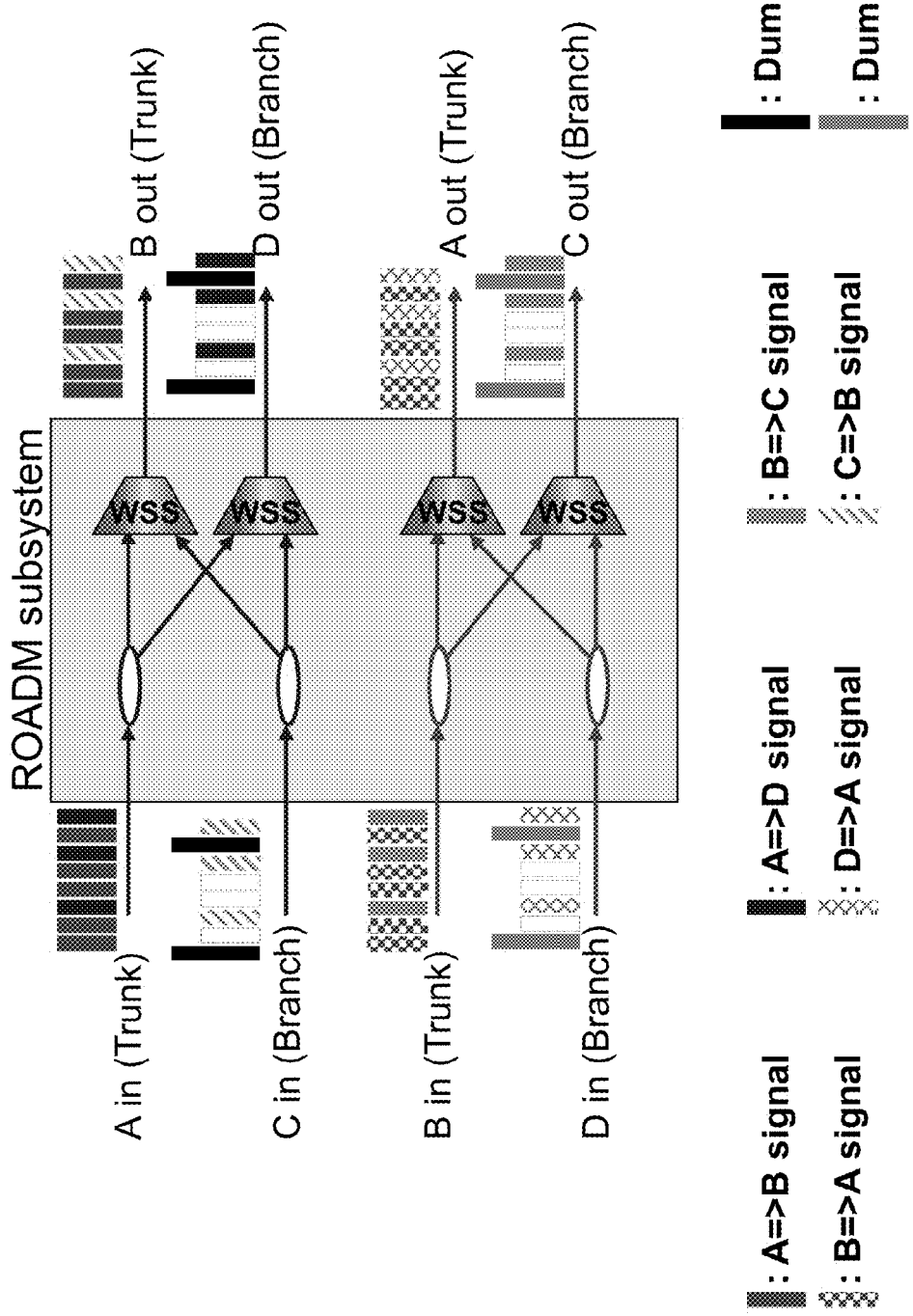
FIG. 5 shows an exemplary splitter-switch WSS-based ROADM subsystem.
Figure 6:
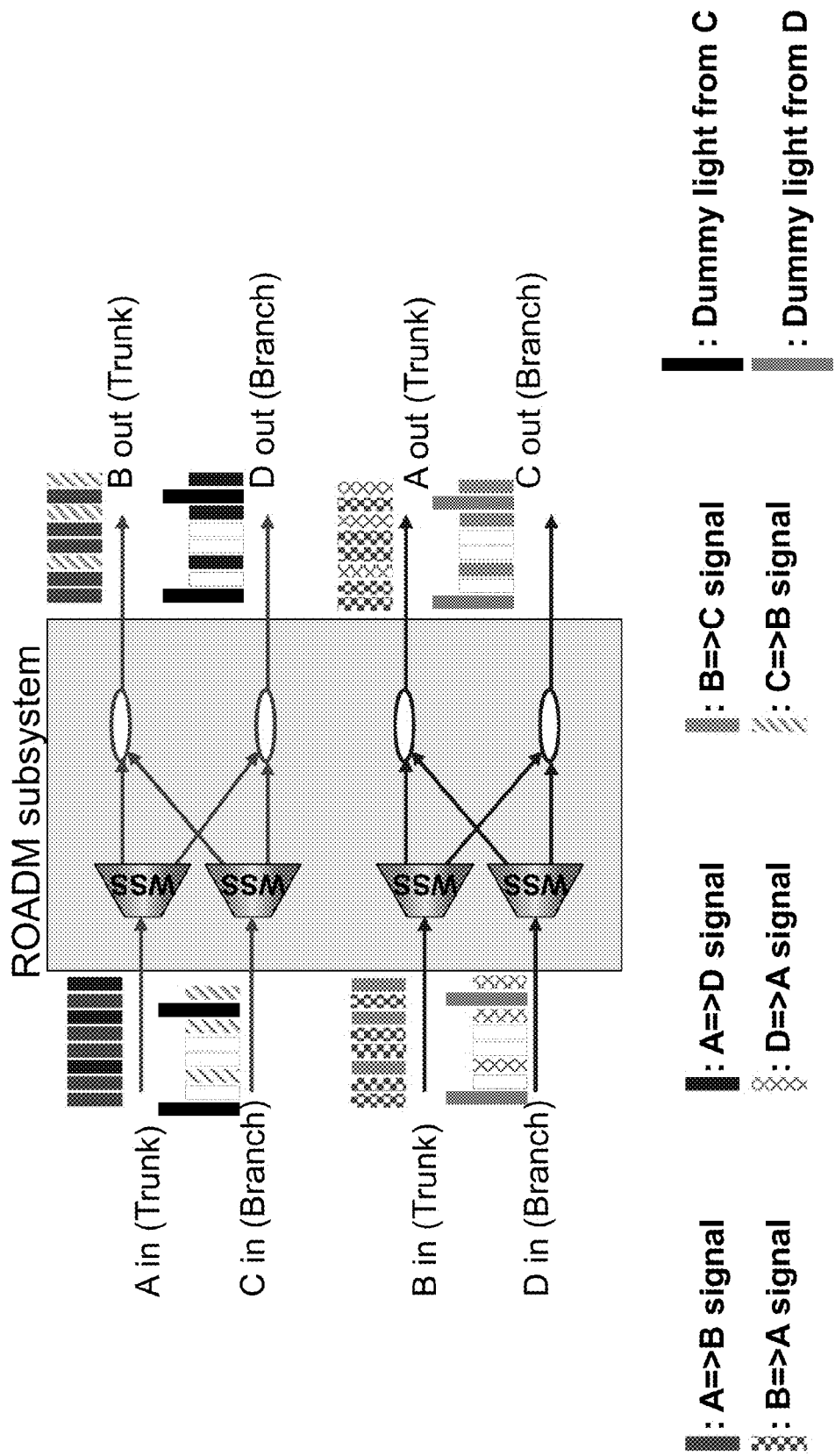
FIG. 6 shows an exemplary switch-coupler WSS-based ROADM subsystem.

FIG. 2 shows an exemplary structure of a Branching Unit. (a) Without add/drop; (b) With add/drop to branch terminal. FIG. 3 shows an exemplary ROADM Unit Configuration. FIG. 4 shows an exemplary Broadcast-and-Select WSS-based ROADM subsystem. FIG. 5 shows an exemplary splitter-switch WSS-based ROADM subsystem. FIG. 6 shows an exemplary switch-coupler WSS-based ROADM subsystem.

Typically, a BU consists of two subcomponents, one is called power switched branching unit (PSBU), and the other is an OADM unit. It's illustrated in FIG. 2A-2B. The PSBU is inserted in the main trunk, and has several 1×2 switches. It can decide whether there will be add/drop to a branch terminal from this point. If there is no branching path connected, or if add/drop to the branch terminal is not required, the switches will send the signals directly along the trunk path (FIG. 2A). This is useful to pre-set a branching point for future use.

Figure 2B:
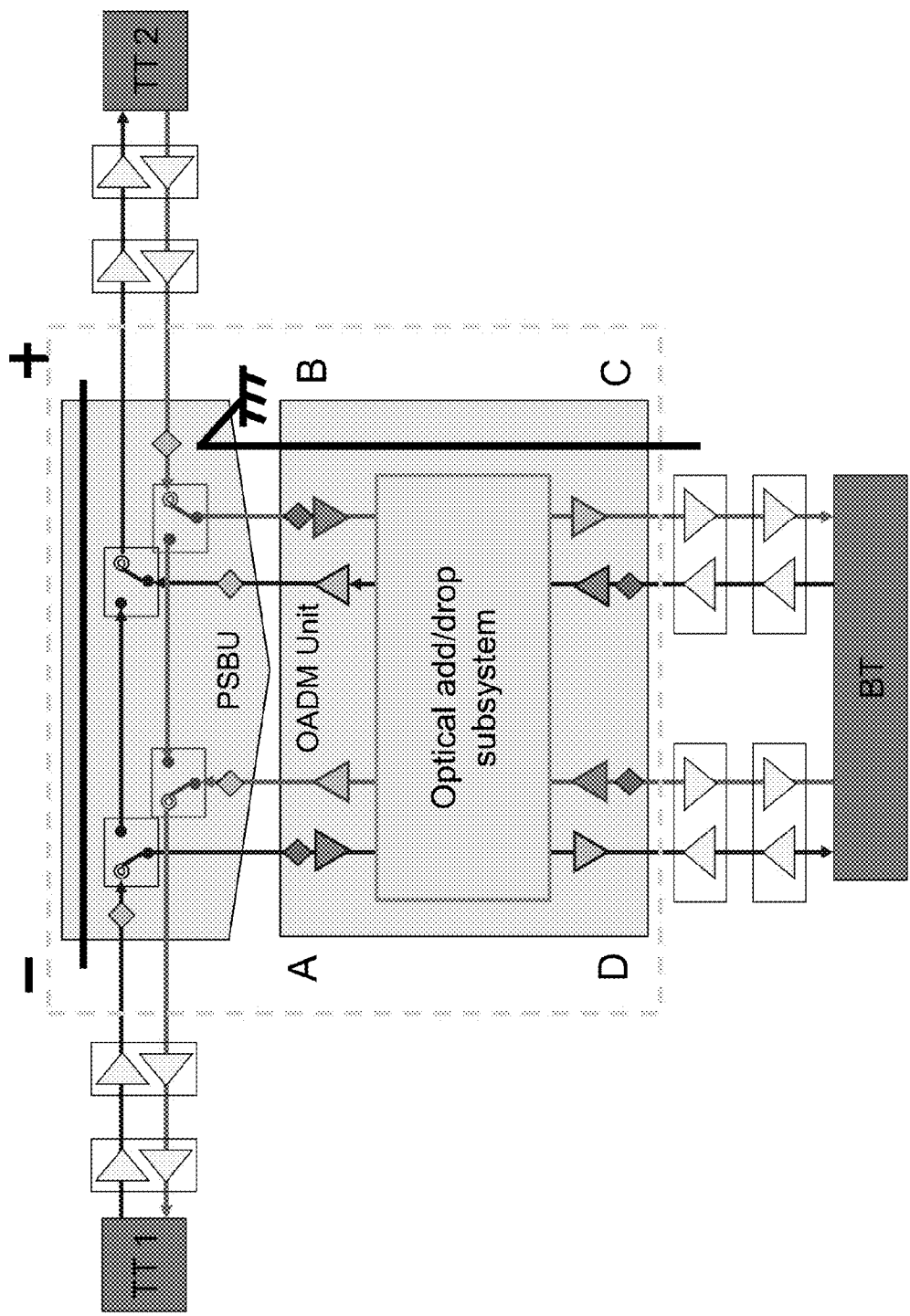
FIG. 2B shows the add/drop to branch terminal.

If add/drop is required, and OADM unit is connected to the PSBU, and the 1×2 switches in the PSBU are switched to send the signal to/from the OADM unit, as shown in FIG. 2B. Inside the OADM unit, a wavelength add/drop subsystem connects the 4 fiber pairs (or 3 pairs, if there's only one branch fiber pair), and performs wavelength add/drop function according to the network requirement. These 4 fiber pairs and the respective ports are named A, B, C, and D in this document, where ports A and B are connected to the main trunk through the PSBU, and ports C and D are connected to the branch terminal. There are optical signal monitors at each input port, and optical amplifiers at the input and output of each port. The OADM unit can be redrawn as FIG. 3.

Conventional BU and the submarine network have fixed, pre-determined wavelength arrangement, therefore no reconfiguration is required. However, the traffic in the global communication network is becoming more dynamic as Internet-based traffic becomes more dominating. Therefore the wavelength reconfigurability is required for the next generation submarine network, with reconfigurable BU as the key enabling element.

Various submarine network BU architectures have been proposed to add reconfigurability and to achieve reconfigurable optical add/drop multiplexing (ROADM) function between the main trunk and branch path in submarine network. The OADM unit becomes a ROADM unit, and the OADM subsystem becomes the ROADM subsystem. These architectures and techniques include using tunable filters, filter array with switch, wavelength-selective switches (WSS), 2×2 switches in bidirectional demultiplexer-switch-multiplexer (DSM) system, 1×2 switches in split-and-select DSM system, 1:2 interleaver with source tuning, 2:2 interleaver with source tuning, etc.

Among these architectures, WSS-based architecture provides the highest level of reconfigurability ($2^K$ configurations can be achieved, where K is the number of WDM channels at the narrowest channel spacing acceptable in the system). (In comparison, the tunable filter-based architectures can deliver K configurations; the 2×2 switch-based architecture can deliver $2^B$ configurations, where B is the number of wavebands, which is a few times smaller than K; and the interleaver-based architecture can deliver $2^K/2$ configurations if there's only one branching split, and fewer configurations at higher split numbers.)

WSS is also the key optical component for wavelength switching in the terrestrial ROADM nodes, it has reached technology maturity in the past decade and is widely available commercially by multiple key optical component vendors, therefore it is most likely that WSS-based architecture will also be the main solution for submarine reconfigurable branching unit design. Since the WSS is a highly integrated optical device and is relatively costly, it is desirable to keep the number of WSS to the minimum. Another highly desirable feature in a submarine branching unit is secure data delivery. Since submarine networks usually connect multiple countries, the possibility of a terminal (country) receiving non-designated data between other terminals (countries) is a serious security risk and should be prevented. Secure data delivery means that only the intended channels will reach each destination terminal (no matter it is a branch terminal or trunk terminal), and thus the data and information carried in each WDM channel cannot be received at unintended terminal.

Therefore an ideal ROADM BU (especially, the ROADM subsystem) has 3 properties: (I) use WSS to achieve full reconfigurability; (II) keep the number of WSS to minimum; and (III) offer secure data delivery.

The current WSS-based ROADM subsystem is shown on FIG. 4. It consists of two optical splitters and two 1×2 WSS. The architecture is called a broadcast-and-select (B&S) architecture, since the input signal from the trunk terminals (A and B) are broadcast into two paths, one for the opposite trunk terminal and is sent through by a WSS to achieve flexible add/drop reconfiguration, while the other is for the branch terminal and is not filtered in the BU. Using the illustration on FIG. 4, Terminal D will receive the A=>B signal (the solid red channels), and the Terminal C will receive the B=>A channels (the checked red channels). It will have to depend on the branch terminal to filter out the unintended channels. Therefore this design satisfied requirements (I) and (II), but cannot achieve the secure data delivery requirement (requirement III).

The second WSS-based ROADM subsystem uses the splitter-switch (SS) configuration, as shown on FIG. 5. At each input, an optical splitter is used to split the signal to two paths, one for the opposite trunk terminal, the other for the branch terminal. At each output, a WSS is used to select only the appropriate signal for the destination terminal, therefore it achieves both full reconfigurability and secure data delivery functions. However it requires four 2×1 WSS units. It's to be noted that even though there is usually no need to send data between the two branch terminal ports (C and D), this architecture provides the C to D link, as well as D to C link. These two links are set up to reuse the fill-in signals (also called dummy lights) to maintain the power.

A similar configuration is called switch-coupler (SC) configuration, as shown on FIG. 6 which places WSS at the input end and the coupler at the output end, the functions and features are essentially the same as the SS design above. Even though it uses WSS in 1×2 setting instead of 2×1, they is no difference since the common WSS products are non-directional (i.e. each WSS can operate in either direction). Also, 2×1 coupler and 1:2 splitter are essentially the same passive optical component. Both the SS and SC WSS-based ROADM configurations achieves requirements (I) and (III), but require higher number (four) of WSS units.

Figure 7:
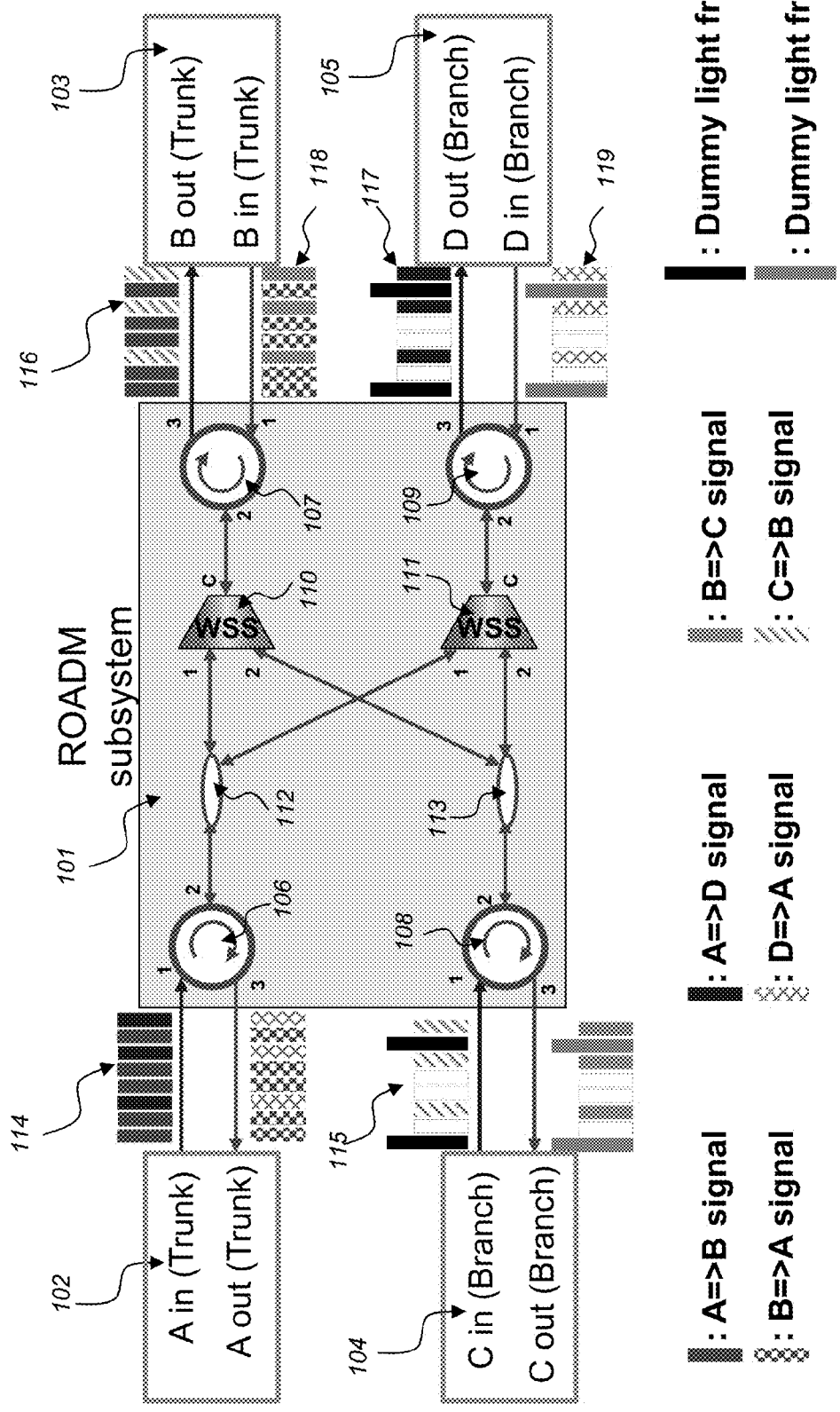
FIG. 7 shows an exemplary bidirectional WSS-based ROADM subsystem.
Figure 8:
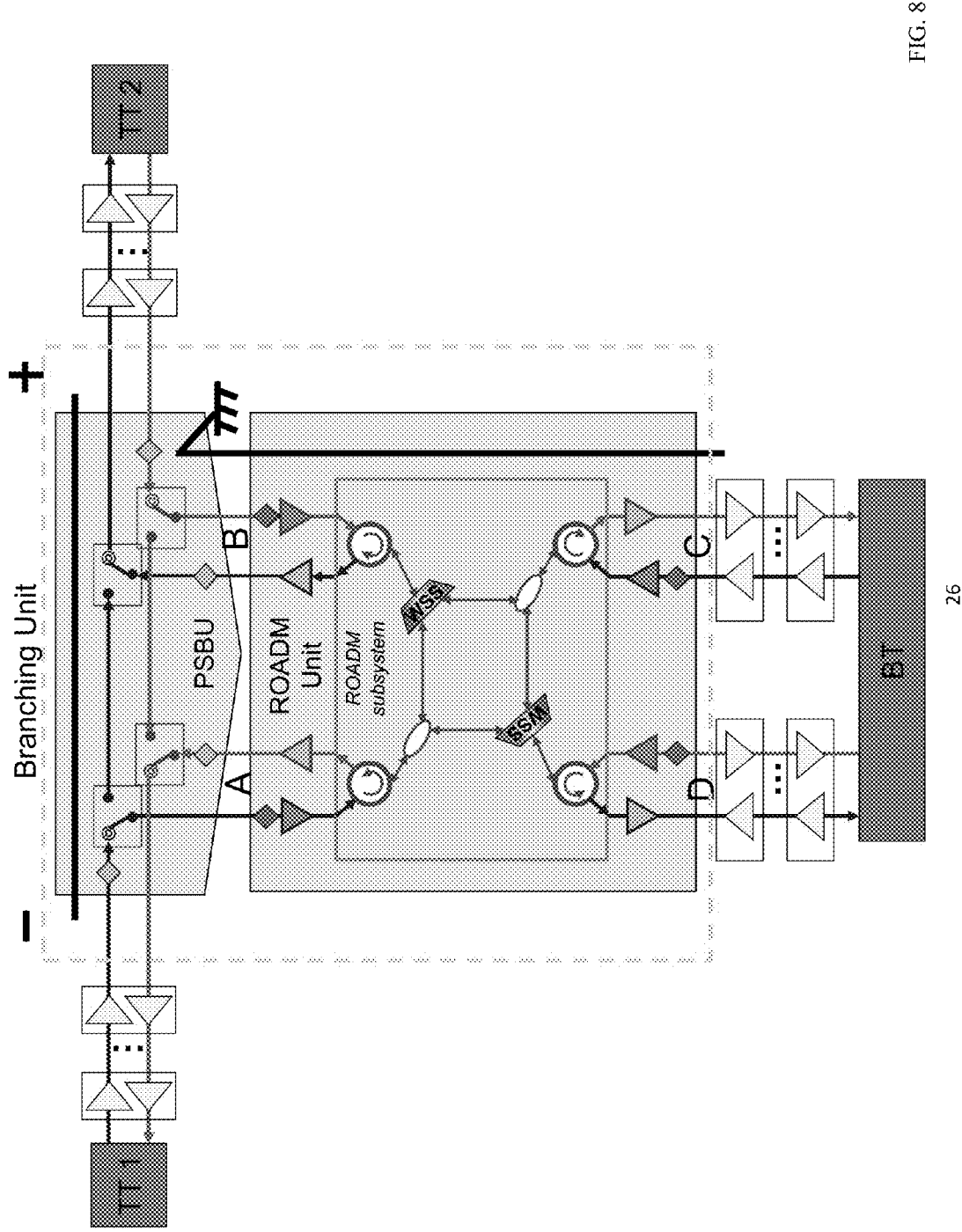
FIG. 8 shows an exemplary ROADM subsystem in a submarine branching unit.

FIG. 7 is a schematic of an exemplary bidirectional WSS-based ROADM subsystem while FIG. 8 is an exemplary schematic of placing the ROADM subsystem into the ROADM unit of a submarine Branching Unit within the submarine transmission network.

The design uses circulators and use bidirectional operation of WSS's within the ROADM subsystem of the submarine branching unit. By doing that, all the 3 requirements described earlier can be met at the same time. The system architecture includes 4 optical circulators, 2 WSS's, 2 couplers, the interconnecting fibers, and the internconnection) and its operation provide efficient ROADM operation. In contrast to prior arts, the WSS is used in uni-directional operation (either as 1×2 or as 2×1), this is the first time the bi-directional operation of WSS is utilized in the submarine branching unit application. The use of optical circulators is also novel, and enables bi-directional operation. The symmetric wavelength assignment feature within the submarine network is also exploited to make the bi-directional operation feasible.

The features of the system of FIG. 7 include:
Low cost (only require 2 WSS's)
Allows full reconfigurability
Secure data delivery
Reuse of dummy light (not requiring light source in the BU to generate dummy light for the outgoing links)

Turning now to FIG. 7, an exemplary bidirectional WSS-based ROADM subsystem (101) is schematized. It serves 2 trunk terminals (A (102) and B (103)), and 2 branch terminals (C (104) and D (105)). It consists of four 3-port optical circulators (106-109), two 2×1 WSS's (110 and 111, also operate as 1×2 WSS's), and two optical splitters/couplers (112 and 113. Since optical splitters and couplers are essentially the same device, we will refer to them as "optical couplers" or simply "couplers" in the remaining document). The 3-port circulator passes signals from Port 1 to Port 2, and Port 2 to Port 3, while isolates/blocks signals in the reverse direction (i.e. Port 2 to Port 1, and Port 3 to Port 2). These components are interconnected through optical fiber within the ROADM subsystem. The signals for each source-destination pair are illustrated as colored and shaded bars next to the input and output fibers.

The input signal from Trunk Terminal A (102) is used as the example here. The signal (114) consists of solid filled red and blue bars, symbolizing different optical channels for different destinations. The signals going to the same destination (such as the solid red bars that are signals from Trunk Terminal A to Trunk Terminal B) do not need to be contiguous in the wavelength/frequency domain, as illustrated.

When the signal (114) enters the ROADM subsystem, it goes through Port 1 of the 3-port optical circulator (106), and exits Port 2 to enter the 1:2 coupler (112). The signal is split to two paths. The first path goes to Input 1 of a 2×1 WSS (110). This WSS is configured by the controller of the ROADM subsystem according to the network's wavelength plan. It picks up only the channels intended for Trunk Terminal B (which are the solid red bars), and discards the remaining channels (the solid blue bars). Since WSS can select each individual channel to either Input 1 or Input 2 independently, all the 2K configurations (where K is the number of WDM channels) can be achieved, delivering full reconfigurability.

The second path (i.e. the second output of coupler 112) is sent to Input 1 of the other 2×1 WSS (111), which picks up the solid blue channels as they are intended for Branch Terminal D, and discards the solid red channels that are intended for Terminal B.

Another terminal that contains signal for Trunk Terminal B is the Branch Terminal C (104). The input signal (115) from this terminal consists of the signals for Terminal B (represented by the shaded green bars), as well as some dummy light (represented by the solid black bars), since there is no need to send signal to other terminals (i.e. A and D). This signal goes through the similar device: enters Port 1 of circulator 108, exists Port 2, then is split by the 1:2 coupler 113 into 2 paths, one of them enters input 2 of WSS 110. As controlled by the BU controller, the WSS selects the intended channels (shaded green channels), and discards the dummy signals. At the output (Common port) of the WSS, the signal is the combination of the A=>B signal (solid red channels) and C=>B signal (shaded green channels). This combined signal (116) enters Port 2 of the Terminal B circulator (107) and exits Port 3, and is sent to the output port for Trunk Terminal B. It contains only the intended channels, ensuring secure data delivery. Due to intelligent network planning and wavelength assignment, there are no wavelength contention between the A=>B channels and C=>B channels.

The second output of the coupler 113 enters Input 2 of 2×1 WSS 111, which filters out the shaded green channels, and keeps the dummy light. The output (Common port) of the WSS consists of the combination of the A=>D signals (solid blue channels) and dummy light from C. This signal (117) enters Port 2 of the circulator 109 and exits Port 3, and is then sent to Branch Terminal D. No unintended signal goes to Terminal D, and the dummy light from Terminal C is reused.

Similar operation is performed for the signals from B and from D. The signals from B (118) is sent through circulator 107 (Port 1 to Port 2) to WSS 110, which now behaves as a 1×2 WSS. The signal intended for Trunk Terminal A (represented by the checked red bars) and the signals intended for Branch Terminal C (represented by the solid green bars) are separated by the WSS at 2 different outputs.

At the same time, the signals from Terminal D (119) goes to WSS 111 through circulator 109 (Port 1 to Port 2), and is separated by the WSS in two parts, one consists of signal intended for Terminal A (represented by the crossed blue bars), and the other consists of dummy light (represented by the shaded black bars). Through the fiber cross-connection, the signals from these two WSS's intended for Trunk Terminal A (i.e. the checked red channels, and crossed blue channels) are combined by coupler 112, which now behaves as a 2:1 coupler, and sent to the intended destination Terminal through circulator 106 (Port 2 to Port 3). The solid green signals from Output 2 of WSS 110 intended for Branch Terminal C is combined with the reused dummy light from Terminal D (Output 2 of WSS 111), and sent to Terminal C through circulator 108 (Port 2 to Port 3).

Due to the symmetric wavelength assignments, both these two WSS's have the same wavelength configuration, and the two opposite direction operations of each WSS also have the same wavelength configuration. As represented in the figure, A=>B (solid red) and B=>A (checked red) paths have the same wavelength channels (let's call it Channel Group I), and A=>D (solid blue), D=>A (checked blue), B=>C (solid green), and C=>B (shaded green) paths have the same wavelength channels (let's call it Channel Group II). Channel I and Channel II are complementary in the overall channel plan. Due to this feature, these WSS's can be used simultaneously in both directions.

The dummy lights (filled-in channels) are used to fill in for the unused channels to maintain the set power level in the transmission link. Therefore the key requirement is the total power level, and not the number of channels or the exact wavelength/frequency. And therefore fewer channels with higher power can be used to substitute more channels with lower power, as illustrated in FIG. 7. Within the signal 115 from Branch Terminal C to the branching unit, only the shaded green channels carry useful information. For the remaining parts of the spectrum, dummy lights are used to fill in. It is not necessary to have the dummy light at each empty channel, instead fewer dummy lights (represented by the solid black bars) are used to balance the total power. These dummy lights are reused at the output links from the BU (such as 117, which reuses the dummy light from 115).

In summary, this new design uses only two 1×2 WSS, and can achieve full $2^K$ reconfigurability, and secure data delivery (only intended signals will reach each destination terminal). Therefore it satisfies all the 3 requirements described above.

Even though the addition of optical circulators will lead to higher insertion loss compared to the 3 prior arts described above, the increase of insertion loss is typically quite low (typically less than 2 dB total for each link), therefore it can be easily compensated by the optical amplifiers at the output of the BU. Another potential issue is the crosstalk from the reverse directional signal, this issue can be mitigated by using high quality optical components, such as optical circulators with high isolation figure, and WSS's with low back-reflection components. Using direct splicing or angled connectors (instead of flat end connectors) can also mitigate the back-reflection issue.

Aspects of the systems and methods provided herein encompass hardware and software for controlling the relevant functions. Software may take the form of code or executable instructions for causing a DSP or other programmable equipment to perform the relevant steps, where the code or instructions are carried by or otherwise embodied in a medium readable by the processor or other machine. Instructions or code for implementing such operations may be in the form of computer instruction in any form (e.g., source code, object code, interpreted code, etc.) stored in or carried by any tangible readable medium.

As used herein, terms such as computer or machine "readable medium" refer to any medium that participates in providing instructions to a processor for execution. Such a medium may take many forms. Non-volatile storage media include, for example, optical or magnetic disks, such as any of the storage devices in any computer(s) shown in the drawings. Volatile storage media include dynamic memory, such as main memory of such a computer platform. Common forms of computer-readable media therefore include for example: a floppy disk, a flexible disk, hard disk, magnetic tape, any other magnetic medium, a CD-ROM, DVD, any other optical medium, punch cards paper tape, any other physical medium with patterns of holes, a RAM, a PROM and EPROM, a FLASH-EPROM, any other memory chip or cartridge, or any other medium from which a computer can read programming code and/or data. Many of these forms of computer readable media may be involved in carrying one or more sequences of one or more instructions to a processor for execution.

It should be noted that various changes and modifications to the presently preferred embodiments described herein will be apparent to those skilled in the art. Such changes and modifications may be made without departing from the spirit and scope of the present invention and without diminishing its attendant advantages.

What is claimed is:

1. A system for communicating in a submarine transmission network, comprising:
    first, second, third and fourth bi-directional terminals; and
    a reconfigurable optical add/drop multiplexer (ROADM) unit coupled to the terminals, including:
    a first optical circulator coupled to the first terminal;
    a second optical circulator coupled to the second terminal;
    a third optical circulator coupled to the third terminal;
    a fourth optical circulator coupled to the fourth terminal;
    a first wavelength-selective switch (WSS), coupled to the first, second, and third optical circulators;
    a second WSS coupled to the first, second, and fourth optical circulators, wherein the first and second WSSes are bidirectional operated;
    a first 1:2 coupler positioned between the first circulator and the first and second WSSes;
    a second 1:2 coupler positioned between the second circulator and the first and second WSSes, wherein input signal from terminals are broadcast into two paths, one of which is an opposite terminal and sent through by one WSS for add/drop reconfiguration;
    a controller specifying symmetric wavelength assignments to the WSSes for simultaneous use in both directions;
    a power switched branching unit (PSBU) coupled to the ROADM unit;
    dummy lights used to balance total power, wherein the dummy lights are reused in the ROADM unit.

2. The system of claim 1, wherein each optical circulator comprises a 3-port circulator.

3. The system of claim 1, wherein the first WSS is configured according to a wavelength plan and picks up only channels intended for the second terminal and discards remaining channels.

4. The system of claim 1, wherein the WSSes select each individual channel to one of two inputs independently.

5. The system of claim 1, wherein input wavelength is assigned to avoid wavelength contention between first to second channels and third to second channels.

6. The system of claim 1, wherein each WSS selects intended channels and discards dummy signals.

7. The system of claim 1, wherein both WSSes have a predetermined wavelength configuration, and two opposite direction operations of each WSS also have the predetermined wavelength configuration.

8. The system of claim 1, wherein the ROADM unit is used in a submarine Branching Unit within the submarine transmission network.

9. The system of claim 1, wherein the WSS comprises a 2×1 WSS.

10. The system of claim 1, wherein the circulators and WSSes are interconnected through optical fibers.

* * * * *